US005626327A

United States Patent [19]

Clark

[11] Patent Number: 5,626,327

[45] Date of Patent: May 6, 1997

[54] SOLENOID-DRIVEN VALVE HAVING A ROLLER BEARING

[75] Inventor: Michael T. Clark, Polo, Ill.

[73] Assignee: Borg-Warner Automotive, Inc., Sterling Heights, Mich.

[21] Appl. No.: 430,203

[22] Filed: Apr. 27, 1995

[51] Int. Cl.$^{6}$ .................................................... F16K 31/06

[52] U.S. Cl. .................................... 251/129.15; 335/262

[58] Field of Search ......................... 251/129.15, 129.01; 335/262; 123/571

[56] References Cited

U.S. PATENT DOCUMENTS

| | | | |
|---|---|---|---|
| 3,635,240 | 1/1972 | Vischulis et al. | 251/129.15 X |
| 4,267,897 | 5/1981 | Takeshima | 335/262 X |
| 4,855,702 | 8/1989 | Swanson et al. | 335/262 X |
| 5,184,593 | 2/1993 | Kobayashi | 123/571 |

*Primary Examiner*—Kevin Lee

*Attorney, Agent, or Firm*—Brooks & Kushman; Greg Dziegielewski

[57] ABSTRACT

An exhaust gas recirculation valve comprising a solenoid device and a valve mechanism is disclosed. The solenoid device has a coil, an armature, and a roller bearing to support a guide mechanically coupled to the armature. The armature and the guide translate with respect to the roller bearing in response to energizing the solenoid device by applying an electrical signal to the coil. The valve mechanism has a stem member which translates with the stem guide for varying fluidic communication between an inlet port and an outlet port in response to the electrical signal.

10 Claims, 2 Drawing Sheets

SOLENOID-DRIVEN VALVE HAVING A ROLLER BEARING

TECHNICAL FIELD

The present invention relates to solenoid-driven valves, and more particularly, to solenoid-driven valves for use in an exhaust gas recirculation system in a vehicle.

BACKGROUND OF THE INVENTION

An exhaust gas recirculation (EGR) system is a system which returns a portion of exhaust gases produced by an engine to the engine's air intake passage. The EGR system acts to maintain a desired air/fuel ratio in the engine cylinders, and to reduce the formation of emissions such as oxides and nitrogen.

The EGR system utilizes an EGR control valve which controls the amount of recirculated exhaust gas which enters the engine's induction system. In many EGR systems, the EGR control valve comprises a vacuum-actuated flow valve. Alternatively, the EGR valve may comprise a solenoid-driven, or solenoid-actuated valve. However, the use of a solenoid valve actuator in combination with an EGR valve may result in an increase in total valve hysteresis due to mechanical friction caused by misalignments. The increase in total valve hysteresis is caused by the two inherent mechanical misalignments of the individual devices (namely, the solenoid actuator and the EGR valve) along with the increased overall stem assembly length.

SUMMARY OF THE INVENTION

It is an object of the present invention to provide a solenoid-type EGR valve having a reduced valve hysteresis.

In carrying out the above object and other objects, the present invention provides an exhaust gas recirculation valve comprising a solenoid device having an armature and a coil. The solenoid device includes a roller bearing to support a guide mechanically coupled to the armature. The armature and the guide translate with respect to the roller bearing in response to energizing the solenoid device, wherein the solenoid device is energized by applying an electrical signal to the coil. The exhaust gas recirculation valve further comprises a valve mechanism having an inlet port and an outlet port. The valve mechanism includes a stem member which translates with the stem guide for varying fluidic communication between the inlet port and the outlet port in response to the electrical signal.

In preferred embodiments of the present invention the solenoid device includes a spring which restores the armature when the solenoid device is deenergized. The spring can be a compression spring positioned between a housing of the roller bearing and a central bore of the armature. It is further preferred that the valve mechanism includes a bronze graphite bushing which supports the stem member. The stem member is formed of stainless steel which is microfinished in a region supported by the bushing.

Embodiments of the present invention accrue many advantages. The utilization of the roller bearing is advantageous in reducing the mechanical friction in the EGR valve, thus reducing the total valve hysteresis. The roller bearing acts as the main load bearing element in the EGR valve. The utilization of the bronze graphite bushing further assists in maintaining the overall valve alignment.

These and other features, aspects, and advantages of the present invention will become better understood with regard to the following description, appended claims, and accompanying drawings.

BEST MODE(S) FOR CARRYING OUT THE INVENTION

Figure 1:
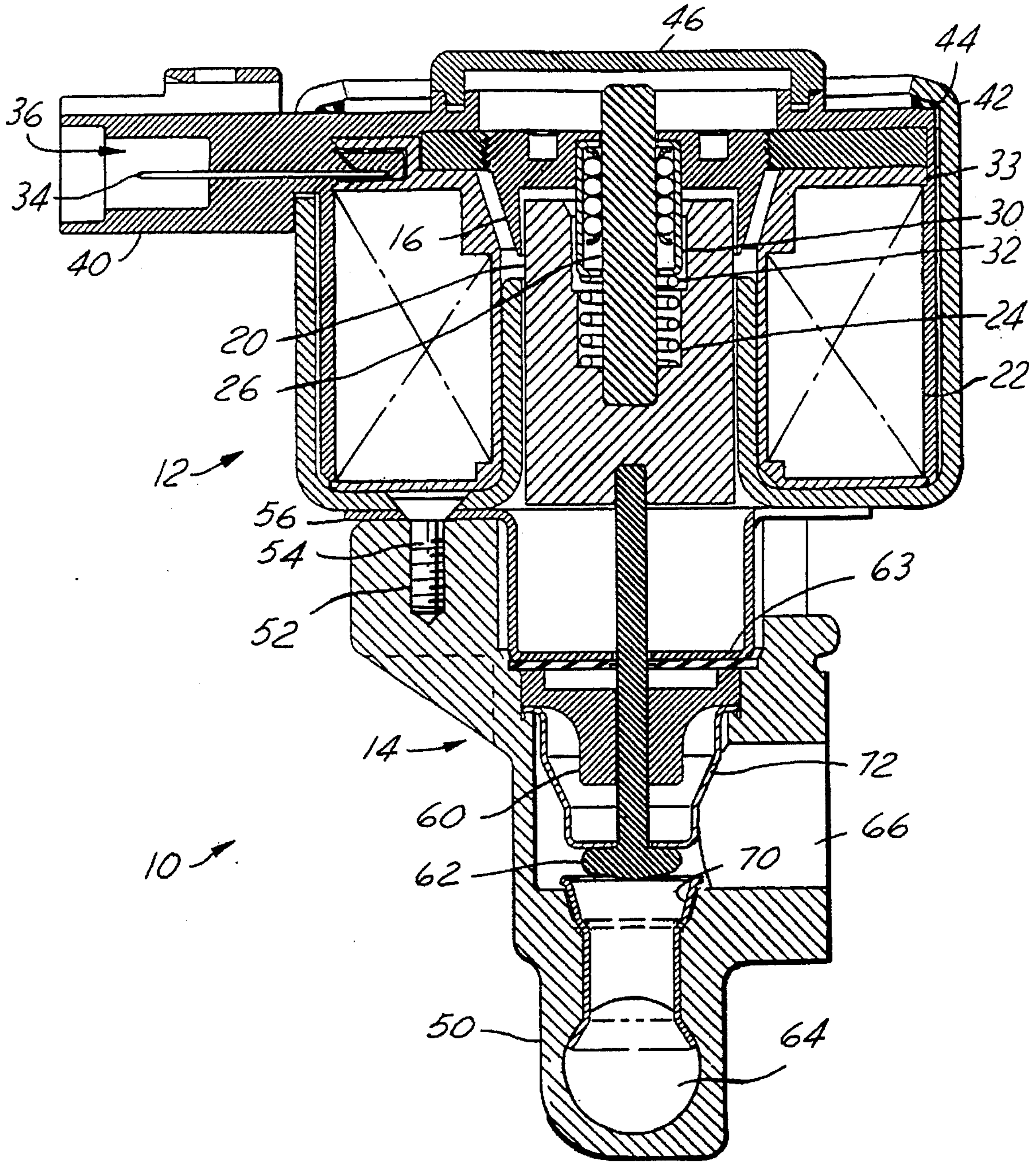
FIG. 1 is a sectional view of an embodiment of a solenoid-actuated EGR valve in accordance with the present invention.

An embodiment of a solenoid-actuated EGR valve, generally indicated by reference numeral 10, in accordance with the present invention is illustrated in FIG. 1. The EGR valve 10 includes a solenoid device generally indicated by reference numeral 12, and a valve mechanism generally indicated by reference numeral 14.

The solenoid device 12 is formed by a pole piece 16, a moveable armature 20, and a coil of wire 22. The pole piece 16 and armature 20 are made of steel in a preferred embodiment. The armature 20 has a central bore 24 which receives a stem guide 26. The stem guide 26 is positioned within a roller bearing 30 which acts as the main load bearing element. The stem guide 26 is formed of steel and has an armoloy NTDC coating in the area in contact with the roller bearing 30.

Situated between the roller bearing 30 and the armature 20 is a spring member 32 used for positioning the armature 20. The spring 32 is preferably a helical compression spring.

The coil 22 is wound about a bobbin 33. The coil 22 is electrically coupled to terminals 34 so that an external electrical activation signal can be applied thereto. The terminals 34 are typically responsive to an electronic control system of the vehicle (not shown) which controls the operation of the EGR valve 10.

An electrical signal applied to the terminals 34 acts to energize the coil 22 and retract the armature 20 toward the pole piece 16 (or upwardly as shown in FIG. 1). The spring member 32 acts to provide a force to restore the armature 20 to its initial position (or a downward position as shown in FIG. 1) when the solenoid is de-energized.

The terminals 34 are housed within a recess 36 defined by an encapsulation 40. The solenoid device 12 is enclosed by a cover 42. The upper portion of the interface between the cover 42 and the encapsulation 40 is sealed by a seal 44. A cap 46 is attached to the encapsulation 40 to enclose the stem guide 26. In a preferred embodiment, the cap 46 is made of a FORTRON material, the cover 42 is formed of steel, and the seal 44 is made of epichlorhydrin.

Figure 2:
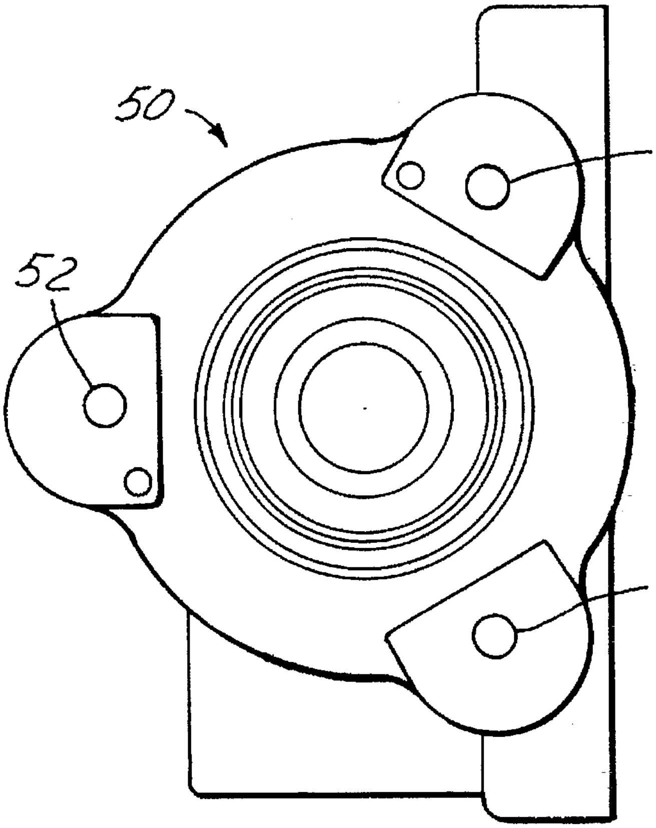
FIG. 2 is a top view of a body member of the valve mechanism.

The valve mechanism 14 comprises a body 50 having holes 52 for receiving corresponding screws 54. The screws 54 are employed to fasten the solenoid device 12 to the valve mechanism 14 through a plate 56. FIG. 2 illustrates a top view of the body 50, wherein three holes 52 receive three screws (not illustrated) to fasten the solenoid device 12 to the valve mechanism 14. Preferably, the plate 56 is formed of stainless steel.

Referring back to FIG. 1, a bushing 60 is contained within the body 50 to support a stem member 62. The stem member 62, in turn, is coupled to the armature 20 and the stem guide 26 to translate therewith. Preferably, the stem member 62 is formed of stainless steel, and the bushing 60 is a bronze graphite bushing to assist in maintaining the overall alignment of the EGR valve 10. Also, the shaft of the stem member 62 is microfinished in a region which contacts the bushing 60 in a preferred embodiment of the present invention. A gasket 63 is located between the plate 56 and the bushing 60.

The stem member 62 controls the fluidic communication between an inlet port 64 and an outlet port 66. In particular, the stem member 62 blocks the flow between the inlet port 64 and the outlet port 66 when abutted against a valve seat 70 mounted in the body 50. The valve seat 70 is formed of stainless steel in a preferred embodiment. A shield 72 shields the flow from the bushing 60 and the shaft of the stem member 62. Preferably, the shield 72 is formed of stainless steel.

Figure 3:
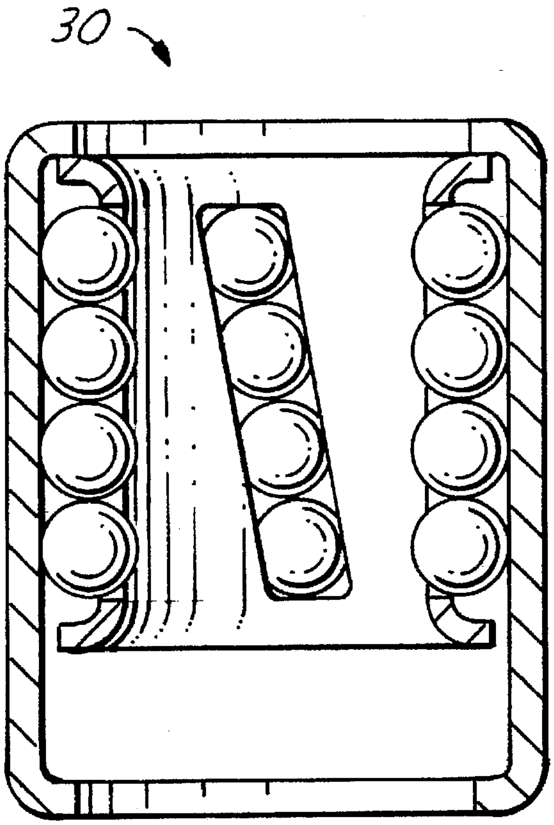
FIG. 3 is a sectional view of a roller bearing for use in embodiments of the present invention.

FIG. 3 shows an illustration of the roller bearing 30 for use in embodiments of the present invention. The roller bearing 30 utilized in a preferred embodiment is a 4 by 4 linear ball bearing, such as part number FC68569 available from INA Bearing Co. It is noted, however, that other types of roller bearings may be utilized in alternative embodiments of the present invention.

The above-described embodiments of the present invention are advantageous in providing a solenoid-driven EGR valve which exhibits a reduced valve hysteresis. The valve hysteresis is reduced by use of the roller bearing, which acts as the main load bearing element, and the bronze graphite bushing which assists in the overall valve alignment. Testing has shown that valve hysteresis is improved when compared to single or double bronze graphite bushing designs.

Although presented in terms of an EGR valve, it is noted that the solenoid-driven valve described herein may be utilized in a wide range of applications.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. An exhaust gas recirculation valve comprising:

a solenoid device having an armature and a coil, the solenoid device including a roller bearing to support a stem guide mechanically coupled to the armature, wherein the armature and the stem guide translate with respect to the roller bearing in response to energizing the solenoid device, the solenoid device energized by applying an electrical signal to the coil; and a valve mechanism having an inlet port and an outlet port, the valve mechanism including a stem member which translates with the stem guide for varying fluidic communication between the inlet port and the outlet port in response to the electrical signal, said valve member including a bronze qraphite bushing supporting said stem member.

2. The exhaust gas recirculation valve of claim 1 wherein the solenoid device includes a spring which restores the armature when the solenoid device is de-energized.

3. The exhaust gas recirculation valve of claim 2 wherein the spring is a compression spring positioned between a housing of the roller bearing and a shoulder in the central bore of the armature.

4. The exhaust gas recirculation valve of claim 1 wherein the valve mechanism includes a valve seat, wherein fluidic communication between the inlet port and the outlet port is blocked when the stem member is abutted against the valve seat.

5. An exhust gas recirculation valve comprising:

a solenoid device having an armature and a coil, the solenoid device including a roller bearing to support a stem guide mechanically coupled to the armature, wherein the armature and the stem guide translate with respect to the roller bearing in response to energizing the solenoid device, the solenoid device energized by applying an electrical signal to the coil;

a valve mechanism having an inlet port and an outlet port, the valve mechanism including a stem member which translates with the stem guide for varying fluidic communication between the inlet port and the outlet port in response to the electrical signal;

said valve mechanism further including a bushing supporting said stem member, said stem member being formed of stainless steel and being microfinished in a region supported by the bushing.

6. An exhaust gas recirculation valve comprising:

a solenoid device having an armature and a coil, the solenoid device including a roller bearing to support a guide mechanically coupled to the armature, wherein the armature and the guide translate with respect to the roller bearing in response to energizing the solenoid device, the solenoid device energized by applying an electrical signal to the coil, the solenoid device including a spring which restores the position of the armature to when the solenoid device is deenergized; and a valve mechanism having an inlet port and an outlet port, the valve mechanism including a stem member which translates with the stem guide for varying fluidic communication between the inlet port and the outlet port in response to the electrical signal, the valve mechanism including a bronze graphite bushing which supports the stem member.

7. The exhaust gas recirculation valve of claim 6 wherein the spring is a compression spring positioned between a housing of the roller bearing and a shoulder in the central bore of the armature.

8. The exhaust gas recirculation valve of claim 6 wherein the stem member is formed of stainless steel, the stem member being microfinished in a region supported by the bushing.

9. The exhaust gas recirculation valve of claim 6 wherein the valve mechanism includes a valve seat, wherein fluidic communication between the inlet port and the outlet port is blocked when the stem member is abutted against the valve seat.

10. An exhaust gas recirculation valve comprising:

a solenoid device having an armature and a coil, the solenoid device including a roller bearing to support a guide mechanically coupled to the armature, wherein the armature and the guide translate with respect to the roller bearing in response to energizing the solenoid device, the solenoid device energized by applying an electrical signal to the coil, the solenoid device including a compression spring positioned between a housing of the roller bearing and a shoulder in the central bore of the armature, the compression spring for restoring the position of the armature when the solenoid device is de-energized; and a valve mechanism having an inlet port and an outlet port, the valve mechanism including a stainless steel stem member which translates with the stem guide for varying fluidic communication between the inlet port and the outlet port in response to the electrical signal, the valve mechanism including a valve seat wherein fluidic communication between the inlet port and the outlet port is blocked when the stem member is abutted against the valve seat, the valve mechanism including a graphite bronze bushing which supports the stem member, the stem member being microfinished in a region supported by the bushing.

* * * * *